United States Patent [19]
Araki

[11] Patent Number: 4,948,238
[45] Date of Patent: Aug. 14, 1990

[54] OPTICAL PROJECTION SYSTEM

[75] Inventors: Nobuhiro Araki, Yokohama; Takeo Sato, Kawasaki; Koichi Kawata, Tokyo; Noboru Nomura, Kyoto; Keisuke Koga, Osaka, all of Japan

[73] Assignee: Matsushita Electric Industrial Co., Ltd., Osaka, Japan

[21] Appl. No.: 321,683

[22] Filed: Mar. 10, 1989

[30] Foreign Application Priority Data

Mar. 11, 1988 [JP] Japan .................................. 63-58739
Feb. 22, 1989 [JP] Japan .................................. 1-42381
Feb. 22, 1989 [JP] Japan .................................. 1-42349

[51] Int. Cl.$^5$ .......................... G02B 9/34; G02B 13/18
[52] U.S. Cl. ...................................... 350/469; 350/432
[58] Field of Search .................................. 350/469, 432

[56] References Cited

FOREIGN PATENT DOCUMENTS 0831156 2/1952 Fed. Rep. of Germany ...... 350/469
57-12966 3/1982 Japan .
60-39624 2/1985 Japan .

OTHER PUBLICATIONS

Primary Examiner—Rodney B. Bovernick
Assistant Examiner—Rebecca D. Gass
Attorney, Agent, or Firm—Lowe, Price, LeBlanc, Becker & Shur

[57] ABSTRACT

A first lens, a second lens, means and a third lens means are arranged successively in a direction of travel of a ray. The first lens means each comprising a single lens element power. The second lens means has a predetermined negative refracting power. The third lens means has a predetermined positive refracting power. A fourth lens means consisting of a plurality of lens elements follows the third lens means in the direction of travel of the ray and has a predetermined positive refracting power. At least one surface of the first, second, third, and fourth lens elements is aspherical. The follwoing conditions (1), (2), and (3) are satisfied:

$$4f < f3 < 20f \quad (1)$$

$$0.65 < (f4/d34) < 1.40 \quad (2)$$

$$10f < R5 \quad (3)$$

where the character "f" denotes a focal length of the optical projection system, the character "f3" denotes a focal length of the third lens means, the character "f4" denotes a focal length of the lens group, the character "d34" denotes a distance between a rear principal point of the third lens means and a front principal point of the fourth lens, and the character "R5" denotes a radius of curvature of a front surface of the third lens means.

6 Claims, 16 Drawing Sheets

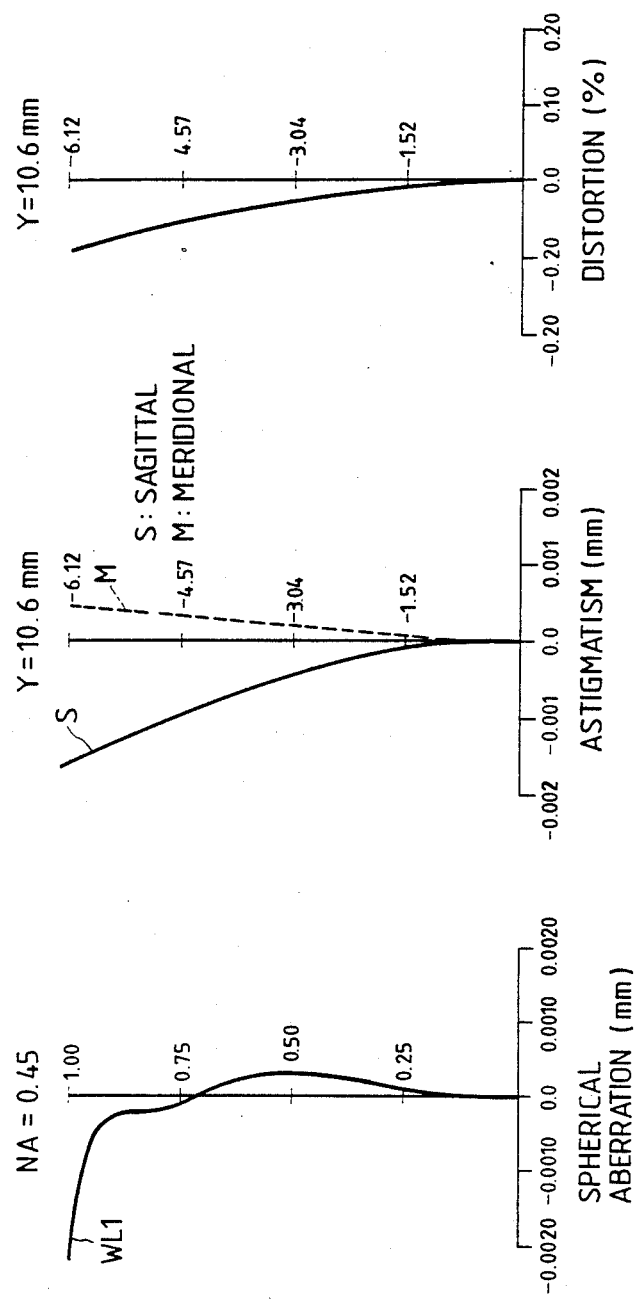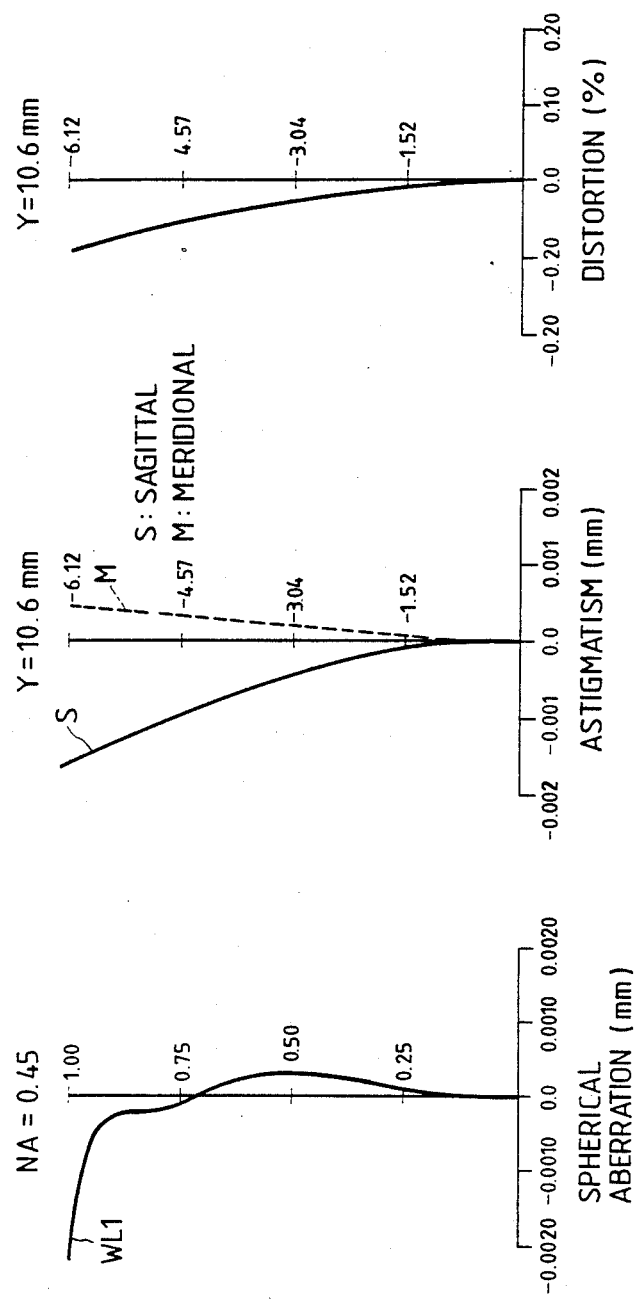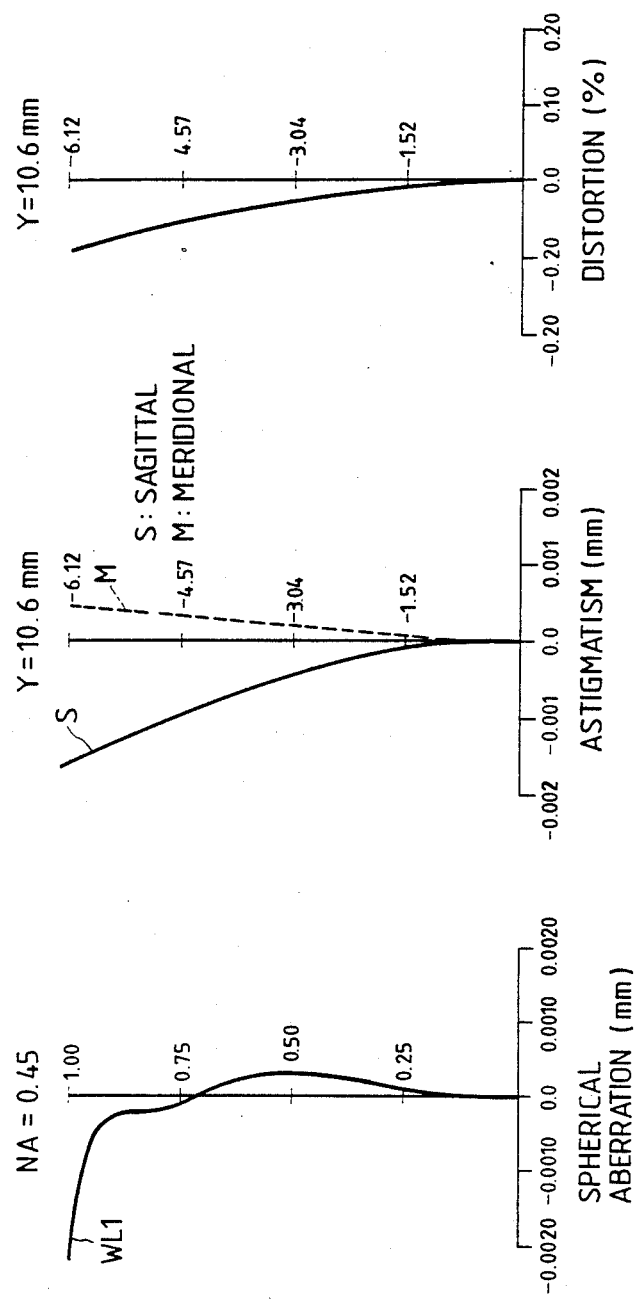

FIG. 3(a)    Y=10.6mm    FIG. 3(b)
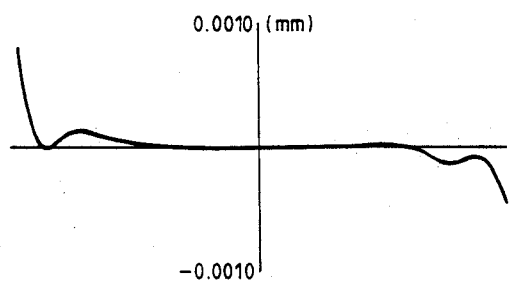
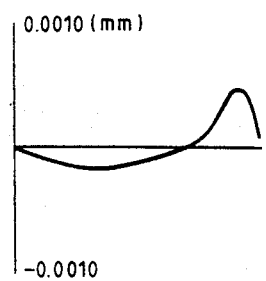
Y= 0 mm
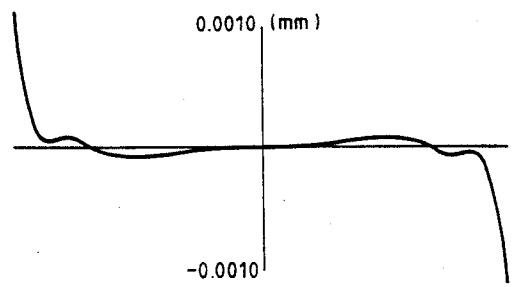
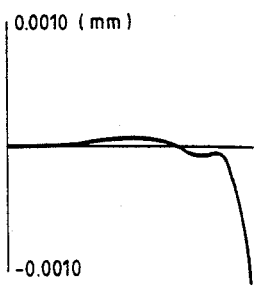
FIG. 3(c)    FIG. 3(d)

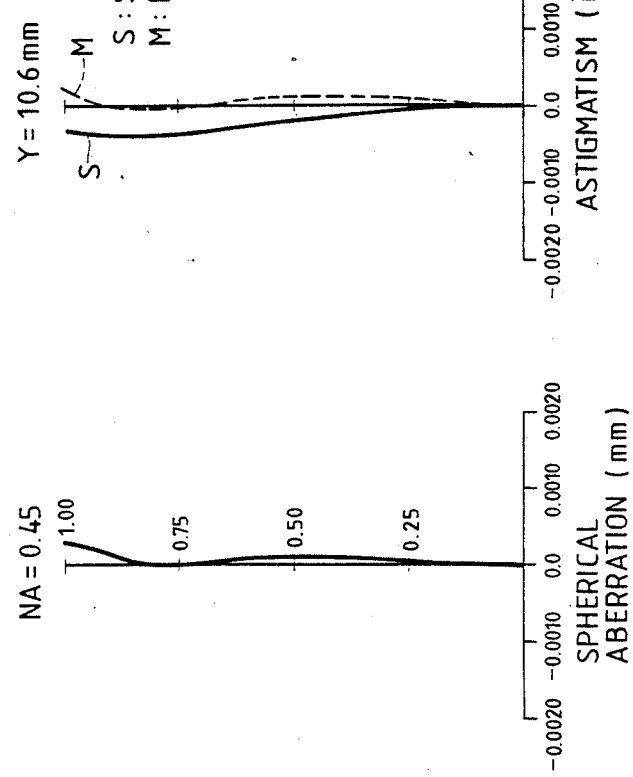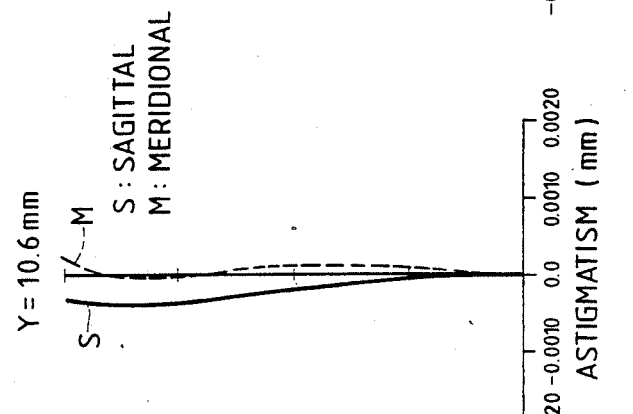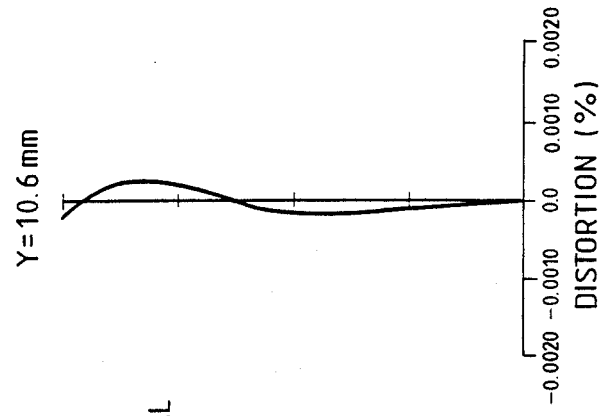

Y=10.6 mm

Y = 0 mm

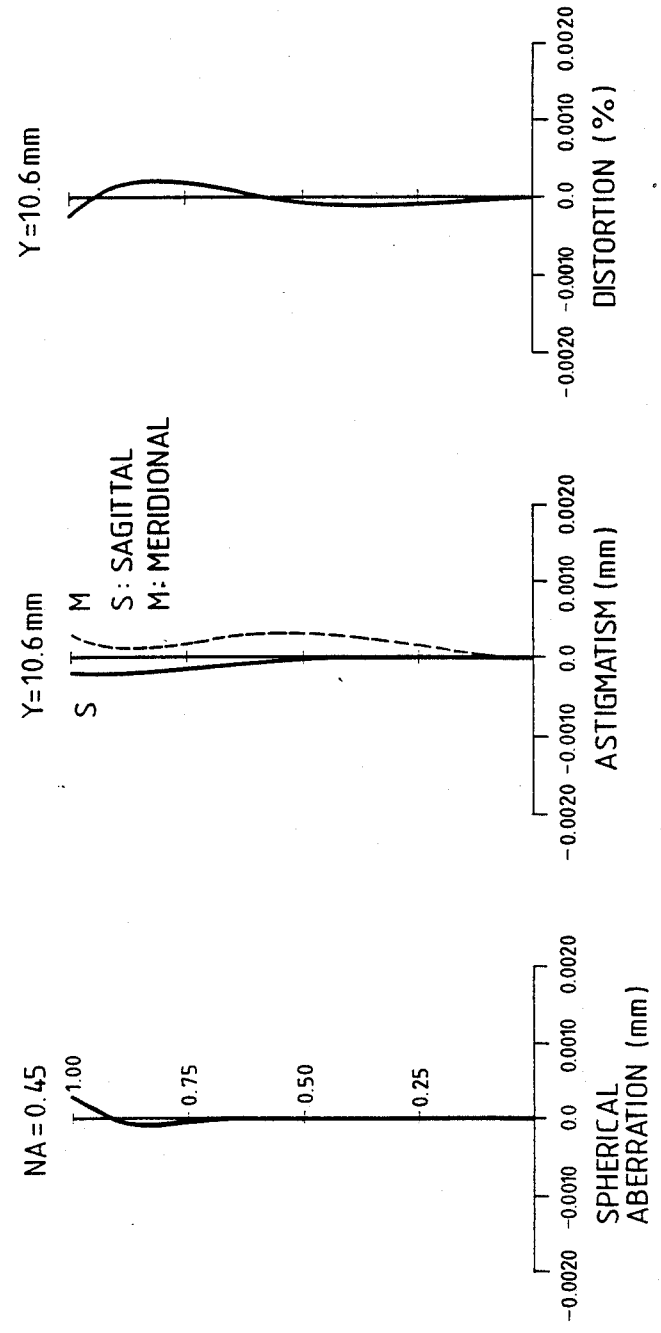

Y = 10.6 mm

Y = 0 mm

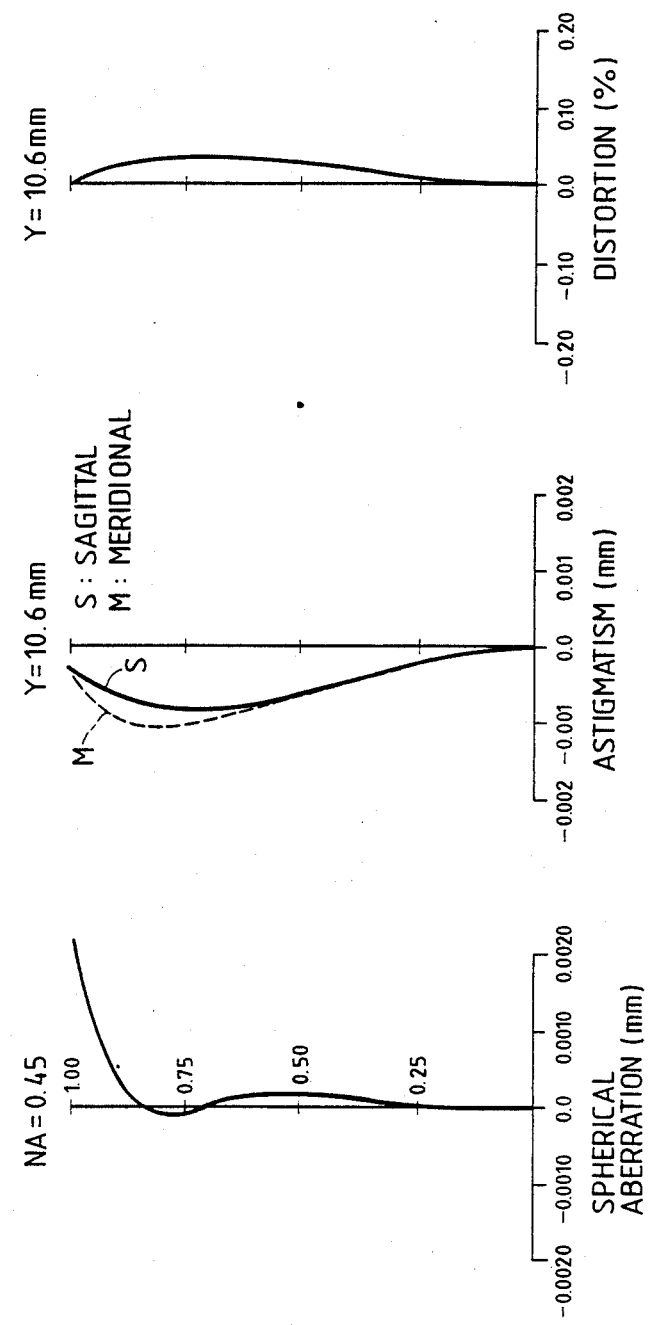

FIG. 13(a)
FIG. 13(b)
Y=10.6 mm
FIG. 13(c)
FIG. 13(d)
Y = 0 mm
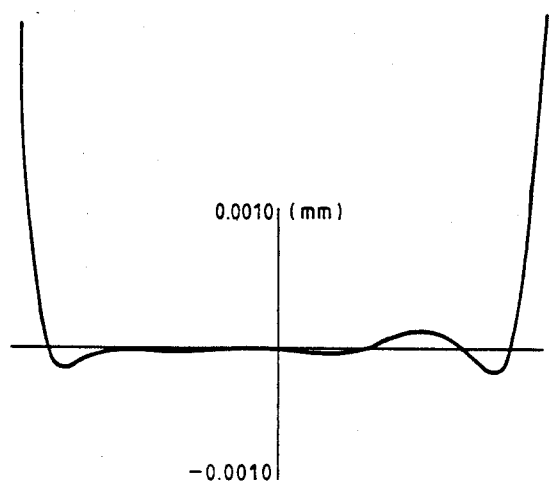
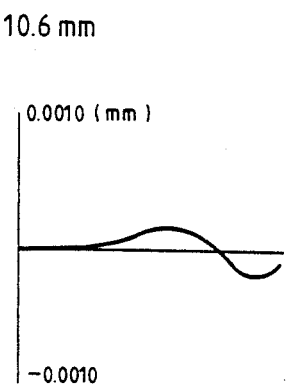
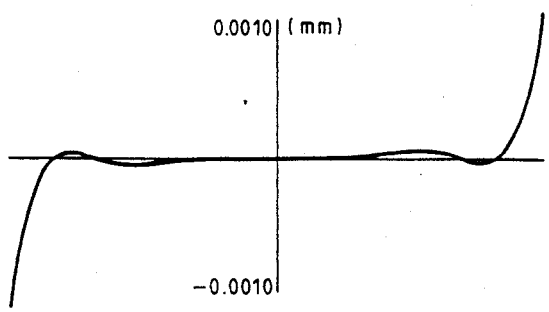
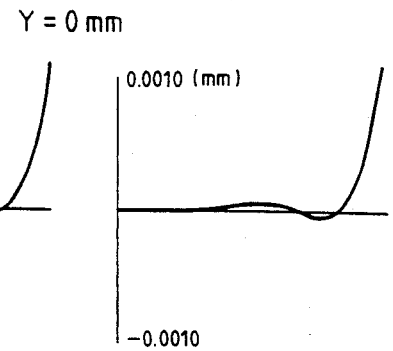

OPTICAL PROJECTION SYSTEM

BACKGROUND OF THE INVENTION

This invention generally relates to an optical projection system, and specifically relates to an optical projection system for photolithography used in producing integrated circuits, large-scale integrated circuits, or other semiconductor devices.

During the fabrication of semiconductor devices such as integrated circuits, photolithography transfers an image from a photographic mask to a resultant pattern on a semiconductor wafer. Such photolithography generally includes a light exposure process in which a semiconductor wafer is exposed to light having information of a mask pattern. Optical projection systems are used to perform the light exposure process.

In general, transferred mask patterns are very fine so that optical projection systems are required to have a high resolution. The high resolution necessitates a large numerical aperture of the optical projection system and also an essentially null aberration of the optical projection system in the light exposure field. In addition, since a plurality of light exposure steps are sequentially performed to transfer different mask patterns onto a semiconductor wafer in an overlapping manner to complete a composite mask pattern, the optical projection system is required to have a very small distortion.

Japanese published examined patent application 57-12966 discloses an optical projection system using a g-line and i-line light source. This prior-art optical projection system generally requires a large number of thick lenses.

Japanese published unexamined patent application 60-28613 discloses an optical projection system using an excimer laser as a light source. This prior-art optical projection system generally requires a large number of lenses. Furthermore, in this prior-art optical projection system, when an ArF excimer laser is used, the laser light is absorbed by lenses of the system at a high rate.

SUMMARY OF THE INVENTION

It is an object of this invention to provide an excellent optical projection system.

In an optical projection system of this invention, a first lens means, a second lens means, a third lens means each comprising a single lens element are arranged successively in a direction of travel of a ray. The first lens means has a predetermined negative refracting power. The second lens means has a predetermined negative refracting power. The third lens means has a predetermined positive refracting power. A fourth lens means consisting a plurality of lens elements follows the third lens means in the direction of travel of the ray and has a predetermined positive refracting power. At least one surface of the first, second, third, and fourth lens means is aspherical. The following conditions (1), (2), and (3) are satisfied:

$$4f < f3 < 20f \quad (1)$$

$$0.65 < (f4/d34) < 1.40 \quad (2)$$

$$10f < R5 \quad (3)$$

where the character "f" denotes a focal length of the optical projection system, the character "f3" denotes a focal length of the third lens, means the character "f4" denotes a focal length of the fourth lens means, the character "d34" denotes a distance between a rear principal point of the third lens and a front principal point of the fourth lens means, and the character "R5" denotes a radius of curvature of a front surface of the third lens means.

BRIEF DESCRIPTION OF THE DRAWINGS

FIG. 2(a) is a diagram showing the spherical aberration in the optical projection system of FIG. 1.

FIG. 2(b) is a diagram showing the astigmatism in the optical projection system of FIG. 1.

FIG. 2(c) is a diagram showing the distortion in the optical projection system of FIG. 1.

FIG. 3(a) is a diagram showing the meridional transverse aberration in the optical projection system of FIG. 1 which occurs under conditions where an image height is 10.60 mm.

FIG. 3(b) is a diagram showing the sagittal transverse aberration of the optical projection system of FIG. 1 which occurs under conditions where the image height is 10.60 mm.

FIG. 3(c) is a diagram showing the meridional transverse aberration in the optical projection system of FIG. 1 which occurs under conditions where the image height is 0 mm.

FIG. 3(d) is a diagram showing the sagittal transverse aberration of the optical projection system of FIG. 1 which occurs under conditions where the image height is 0 mm.

FIG. 5(a) is a diagram showing the spherical aberration in the optical projection system of FIG. 4.

FIG. 5(b) is a diagram showing the astigmatism in the optical projection system of FIG. 4.

FIG. 5(c) is a diagram showing the distortion in the optical projection system of FIG. 4.

FIG. 9(a) is a diagram showing the spherical aberration in the optical projection system of FIG. 8.

FIG. 9(b) is a diagram showing the astigmatism in the optical projection system of FIG. 8.

FIG. 9(c) is a diagram showing the distortion in the optical projection system of FIG. 8.

FIG. 12(a) is a diagram showing the spherical aberration in the optical projection system of FIG. 11.

FIG. 12(b) is a diagram showing the astigmatism in the optical projection system of FIG. 11.

FIG. 12(c) is a diagram showing the distortion in the optical projection system of FIG. 11.

FIG. 13(a) is a diagram showing the meridional transverse aberration in the optical projection system of FIG. 11 which occurs under conditions where an image height is 10.60 mm.

FIG. 13(b) is a diagram showing the sagittal transverse aberration of the optical projection system of FIG. 11 which occurs under conditions where the image height is 10.60 mm.

FIG. 13(c) is a diagram showing the meridional transverse aberration in the optical projection system of FIG. 11 which occurs under conditions where the image height is 0 mm.

FIG. 13(d) is a diagram showing the sagittal transverse aberration of the optical projection system of FIG. 11 which occurs under conditions where the image height is 0 mm.

DESCRIPTION OF THE FIRST PREFERRED EMBODIMENT

Figure 1:
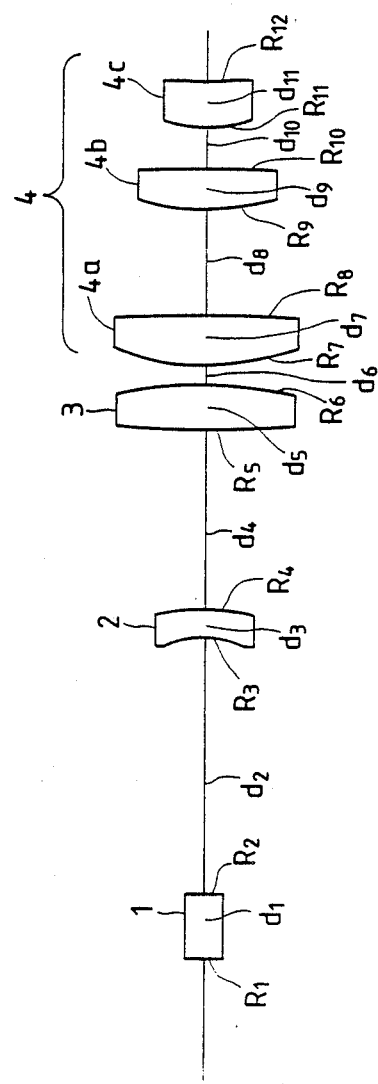
FIG. 1 is a sectional view of an optical projection system according to a first embodiment of this invention.

With reference to FIG. 1, an optical projection system according to a first embodiment of this invention includes a first lens means 1, a second lens means 2 following the first lens 1, and a third lens 3 following the second lens 2. A fourth lens means 4 comprising lens elements 4a, 4b, and 4c succeeds the third lens means 3. The lens element 4a of the fourth lens means 4 immediately follows the third lens means 3. In the fourth lens means 4, the lens element 4a precedes the lens element 4b, and the lens 4c follows the lens element 4b. Incident rays sequentially pass through the first lens means 1, the second lens 2, the third lens 3, and the fourth lens means 4. These lens elements 1–4c are supported by known devices (not shown) in such a manner that they have a common optical axis.

The first lens means 1 has a negative refracting power. The second lens means 2 has a negative refracting power. The third lens means 3 has a positive refracting power. The fourth lens elements 4a–4c have positive refracting powers. The fourth lens means 4 has a positive refracting power.

It is preferable that at least one surface of the lens elements 1–4c is aspherical. It is preferable that the following conditions (1), (2), and (3) are satisfied:

$$4f < f3 < 20f \tag{1}$$

$$0.65 < (f4/d34) < 1.40 \tag{2}$$

$$10f < R5 \tag{3}$$

where the character "f" denotes a focal length of the optical projection system, the character "f3" denotes a focal length of the third lens means 3, the character "f4" denotes a focal length of the fourth lens means 4, the character "d34" denotes a distance between a rear prinicpal point of the third lens means 3 and a front principal point of the fourth lens means 4, and the character "R5" denotes a radius of curvature of a front surface of the third lens means 3.

Various characters will be introduced to specify the characteristics of the lens elements 1–4c and the relationships among the lens elements 1–4c. The radii of curvature of the front surface and the rear surface of the first lens means 1 are denoted by the characters R1 and R2 respectively. The radii of curvature of the front surface and the rear surface of the second lens means 2 are denoted by the characters R3 and R4 respectively. The radii of curvature of the front surface and the rear surface of the third lens means 3 are denoted by the characters R5 and R6 respectively. The radii of curvature of the front surface and the rear surface of the lens element 4a are denoted by the characters R7 and R8 respectively. The radii of curvature of the front surface and the rear surface of the lens element 4b are denoted by the characters R9 and R10 respectively. The radii of curvature of the front surface and the rear surface of the lens element 4c are denoted by the characters R11 and R12 respectively.

The thickness of the first lens means 1 is denoted by the character d1. The thickness of the second lens means 2 is denoted by the character d3. The thickness of the third lens means 3 is denoted by the character d5. The thickness of the lens element 4a is denoted by the character d7. The thickness of the lens element 4b is denoted by the character d9. The thickness of the lens element 4c is denoted by the character d11. It should be noted that the lens thicknesses d1, d3, d5, d7, d9, and d11 are measured along the optical axis.

The distance between the rear surface of the first lens means 1 and the front surface of the second lens 2 is denoted by the character d2. The distance between the rear surface of the second lens means 2 and the front surface of the third lens means 3 is denoted by the character d4. The distance between the rear surface of the third lens means 3 and the front surface of the lens element 4a is denoted by the character d6. The distance between the rear surface of the lens element 4a and the front surface of the lens element 4b is denoted by the character d8. The distance between the rear surface of the lens element 4b and the front surface of the lens element 4c is denoted by the character d10. It should be noted that these distances d2, d4, d6, d8, and d10 are measured along the optical axis.

The refractive indexes of glass material of the lenses 1, 2, 3, 4a, 4b, and 4c are denoted by the characters n1, n2, n3, n4, n5, and n6 respectively. These refractive indexes n1–n6 are determined with respect to light having a wavelength of 193 nm.

In one example of the optical projection system of this embodiment, the lens elements 1, 2, 3, 4a, 4b, and 4c are designed so that the previously-mentioned lens parameters have the following values.

| | | |
|---|---|---|
| R1 = −573.75000 | d1 = 200.00 | n1 = 1.560769 |
| R2 = 591.4613 | d2 = 813.129 | |
| R3 = −329.1979* | d3 = 90.687 | n2 = 1.560769 |
| R4 = −666.4207 | d4 = 555.124 | |
| R5 = 2262.686* | d5 = 140.741 | n3 = 1.560769 |
| R6 = −1193.422 | d6 = 57.632 | |
| R7 = 855.7510 | d7 = 153.836 | n4 = 1.560769 |
| R8 = −7183.481 | d8 = 333.031 | |
| R9 = 754.1443 | d9 = 129.443 | n5 = 1.560769 |
| R10 = −5310.126 | d10 = 125.81 | |
| R11 = 347.1155 | d11 = 149.823 | n6 = 1.560769 |
| R12 = 538.1785* | | | where the character "*" denotes that the related surface is aspherical, and the radii R1–R12 and the thicknesses and the distances d1–d11 are represented in unit of mm.

The aspherical surfaces (R3, R5, and R12) of the lens elements 2, 3, and 4c are designed as follows. In general, the characteristics of an aspherical surface are defined in the following known equation.

$$Z(h) = [(h^2/R)/\{1 + \sqrt{1 - (1 + K)h^2/R^2}\}] + Ah^4 + Bh^6 + Ch^8 + Dh^{10} \ldots \quad (1)$$

where the character $Z(h)$ denotes a sag quantity; the character "h" denotes a distance from the optical axis; the character R denotes a radius of curvature; the character K denotes a conic coefficient; and the characters A, B, C, and D denote aspherical surface coefficients.

In respect of the aspherical surface (R3) of the lens means 2, the coefficients K and A–D are chosen as follows.

| | | | |
|---|---|---|---|
| R3: | K = −0.03608 | A = 2.014E-10 | B = −2.302E-15 |
| | | C = 4.0234E-20 | D = 2.721E-24 | where the character E denotes an exponential, and "E-N" means that the value which precedes "E-N" is multiplied by $10^{-N}$.

In respect of the aspherical surface (R5) of the lens means 3, the coefficients K and A–D are chosen as follows.

| | | | |
|---|---|---|---|
| R5: | K = 5.661 | A = −8.343E-10 | B = 2.499E-16 |
| | | C = 2.187E-21 | D = −3.910E-23 |

In respect of the aspherical surface (R12) of the lens element 4c, the coefficients K and A–D are chosen as follows.

| | | | |
|---|---|---|---|
| R12: | K = 1.810 | A = 1.213E-9 | B = −2.094E-14 |
| | | C = 4.809E-18 | D = −9.969E-23 |

The previously-mentioned example of the optical projection system has the following characteristics. Under conditions where light having a wavelength $\lambda$ of 193 nm is used and an image height Y is 10.60 mm: the focal length "f" of the optical projection system is 100 mm; the numerical aperature N.A. of the optical projection system is 0.45; the magnification of the optical projection system is 1/5; the focal length f3 of the third lens means 3 is 1382.40 mm; and the ratio "f4/d34" between the focal length f4 of the fourth lens means 4 and the distance d34 between the rear principal point of the third lens means 3 and the front principal point of the fourth lens means 4 is 1.129.

FIG. 2(a), FIG. 2(b), and FIG. 2(c) show the spherical aberration, the astigmatism, and the distortion of the previously-mentioned example of the optical projection system respectively.

FIG. 3(a) and FIG. 3(b) show the meridional transverse aberration and the sagittal transverse aberration of the previously-mentioned example of the optical projection system respectively under conditions where the image height Y is 10.60 mm. FIG. 3(c) and FIG. 3(d) show the meridional transverse aberration and the sagittal transverse aberration of the previously-mentioned example of the optical projection system respectively under conditions where the image height Y is 0 mm.

The first lens means 1 and the second lens 2 function to perform a correction which moves Petzval's sum to a value near zero. The third lens means 3 and the fourth lens means 4 are designed to form a dioptric Schmidt optical system which corrects the coma and the spherical aberration of the optical projection system. These corrective arrangements and the provision of at least one aspherical lens surface ensure that the optical projection system can be essentially free from aberrations and can be composed of a small number of lens elements. In addition, the optical projection system absorbs light at a lower rate than that in the prior art systems.

DESCRIPTION OF THE SECOND PREFERRED EMBODIMENT

Figure 4:
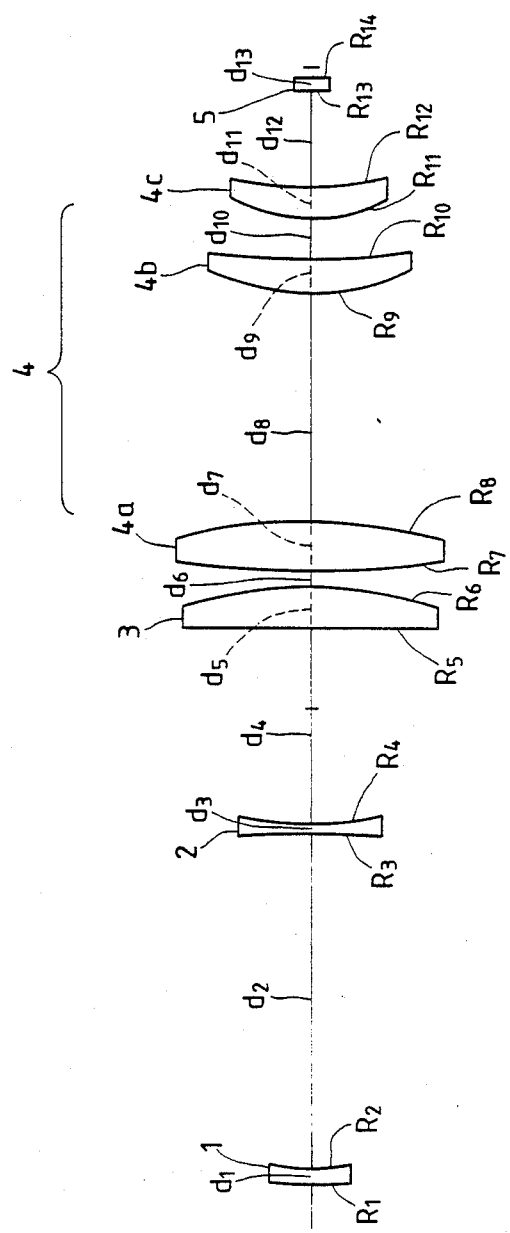
FIG. 4 is a sectional view of an optical projection system according to a second embodiment of this invention.

FIG. 4 shows a second embodiment of this invention which is similar to the embodiment of FIGS. 1–3 except for the following design changes. The embodiment of FIG. 4 additionally includes a fifth lens means, consisting of a single lens element 5 which succeeds a fourth lens element 4. The fifth lens means 5 has a common optical axis with lens means 1–3 and the fourth lens means 4. The fifth lens means 5 has a negative refracting power.

The radii of curvature of the front surface and the rear surface of the fifth lens means 5 are denoted by the characters R13 and R14. The distance between the rear surface of a lens 4c and the front surface of the fifth lens means 5 which is measured along the optical axis is denoted by the character d12. The thickness of the fifth lens means 5 which is measured along the optical axis is denoted by the character d13. With respect to light having a wavelength of 193 nm, the refractive index of glass material of the fifth lens 5 is denoted by the character n7.

In one example of the optical projection system of this embodiment, the lens elements 1, 2, 3, 4a, 4b, 4c, and 5 are designed so that their lens parameters have the following values.

| | | |
|---|---|---|
| R1 = 361.1966* | d1 = 17.861 | n1 = 1.560769 |
| R2 = 149.2153 | d2 = 429.297 | |
| R3 = −2254.465* | d3 = 16.824 | n2 = 1.560769 |
| R4 = 489.8852 | d4 = 247.598 | |
| R5 = 2993.532* | d5 = 52.384 | n3 = 1.560769 |
| R6 = −564.7170 | d6 = 21.052 | |
| R7 = 1029.028 | d7 = 64.766 | n4 = 1.560769 |
| R8 = −632.4123 | d8 = 283.667 | |
| R9 = 280.7900 | d9 = 48.378 | n5 = 1.560769 |
| R10 = 920.3827 | d10 = 46.114 | |
| R11 = 174.9364 | d11 = 45.734 | n6 = 1.560769 |
| R12 = 348.2636* | d12 = 124.315 | |
| R13 = −254.2200* | d13 = 16.855 | n7 = 1.560769 |
| R14 = −2140.726 | | | where the character "*" denotes that the related surface is aspherical, and the radii R1–R14 and the thicknesses and the distances d1–d14 are represented in unit of mm.

The aspherical surfaces (R1, R3, R5, R12, and R13) of the lens elements 1, 2, 3, 4c, and 5 are designed as follows. As described previously, the characteristics of an aspherical surface are defined in the equation (1).

In respect of the aspherical surface (R1) of the lens 1, the coefficients K and A–D are chosen as follows.

| | | | |
|---|---|---|---|
| R1: | K = −5.946 | A = 4.194E-8 | B = 2.179E-13 |
| | | C = −1.844E-16 | D = 3.136E-20 | where the character E denotes an exponential, and "E-N" means that the value which precedes "E-N" is multiplied by $10^{-N}$.

In respect of the aspherical surface (R3) of the lens means 2, the coefficients K and A–D are chosen as follows.

| | | | |
|---|---|---|---|
| R3: | K = −369.862 | A = −1.603E-8 | B = 2.167E-13 |
| | | C = −4.502E-18 | D = 2.483E022 |

In respect of the aspherical surface (R5) of the lens means 3, the coefficients K and A–D are chosen as follows.

| | | | |
|---|---|---|---|
| R5: | K = 29.473 | A = −1.310E-9 | B = −7.525E-15 |
| | | C = 2.489E-20 | D = −2.782E-25 |

In respect of the aspherical surface (R12) of the lens element 4c, the coefficients K and A–D are chosen as follows.

| | | | |
|---|---|---|---|
| R12: | K = 0.0327 | A = −1.065E-9 | B = −1.233E-13 |
| | | C = 8.755E-19 | D = 1.161E-23 |

In respect of the aspherical surface (R13) of the lens means 5, the coefficients K and A–D are chosen as follows.

| | | | |
|---|---|---|---|
| R13: | K = −62.855 | A = −7.389E-7 | B = 2.930E-10 |
| | | C = −2.209E-14 | D = −6.476E-17 |

Under conditions where light having a wavelength λ of 193 nm is used and an image height Y is 10.60 mm: the focal length "f" of the optical projection system is 100 mm; the numerical aperture N.A. of the optical projection system is 0.45; the magnification of the optical projection system is 1/5; the focal length f3 of the third lens means 3 is 851.722 mm; and the ratio "f4/d34" between the focal length f4 of the fourth lens means 4 and the distance d34 between the rear principal point of the third lens means 3 and the front principal point of the fourth lens means 4 is 0.882.

FIG. 5(a), FIG. 5(b), and FIG. 5(c) show the spherical aberration, the astigmatism, and the distortion of the optical projection system respectively.

Figure 6A:
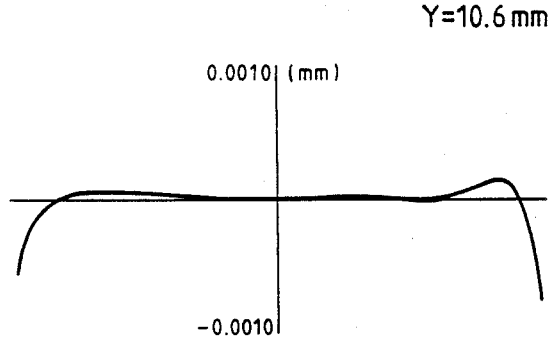
FIG. 6(a) is a diagram showing the meridional transverse aberration in the optical projection system of FIG. 4 which occurs under conditions where an image height is 10.60 mm.
Figure 6B:
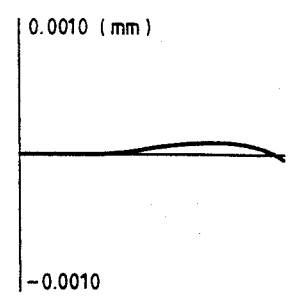
FIG. 6(b) is a diagram showing the sagittal transverse aberration of the optical projection system of FIG. 4 which occurs under conditions where the image height is 10.60 mm.
Figure 6C:
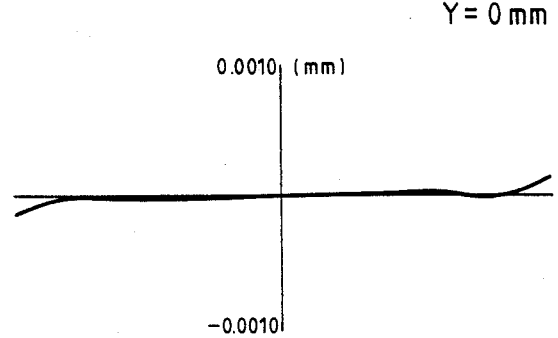
FIG. 6(c) is a diagram showing the meridional transverse aberration in the optical projection system of FIG. 4 which occurs under conditions where the image height is 0 mm.
Figure 6D:
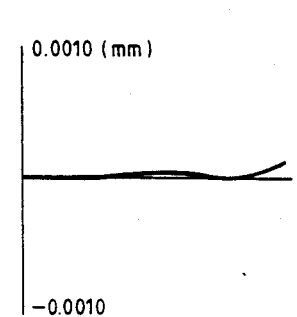
FIG. 6(d) is a diagram showing the sagittal transverse aberration of the optical projection system of FIG. 4 which occurs under conditions where the image height is 0 mm.

FIG. 6(a) and FIG. 6(b) show the meridional transverse aberration and the sagittal transverse aberration of the optical projection system respectively under conditions where the image height Y is 10.60 mm. FIG. 6(c) and FIG. 6(d) show the meridional transverse aberration and the sagittal transverse aberration of the optical projection system respectively under conditions where the image height Y is 0 mm.

Figure 7:
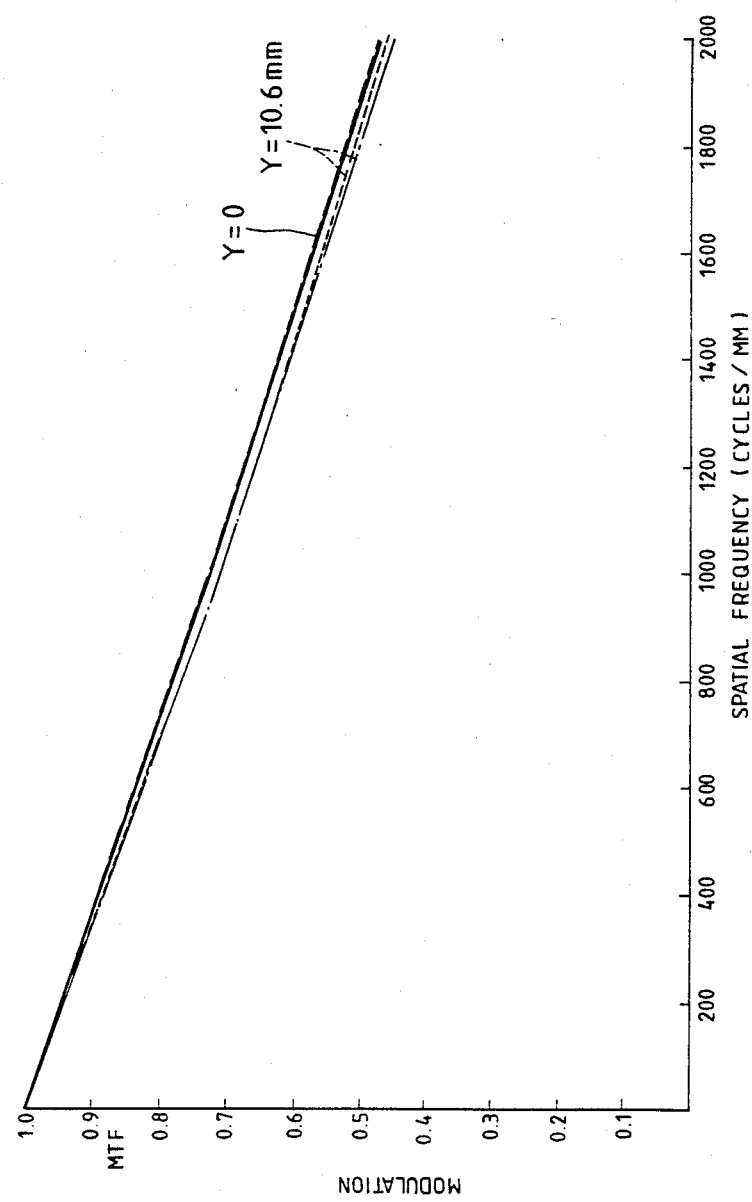
FIG. 7 is a diagram showing the relationship between the modulation transfer function and the spatial frequency in the optical projection system of FIG. 4.

FIG. 7 shows the relationship between the modulation transfer function (MTF) and the spatial frequency of the projection optical system under conditions where the image height Y is 10.60 mm and the image height Y is 0 mm.

DESCRIPTION OF THE THIRD PREFERRED EMBODIMENT

Figure 8:
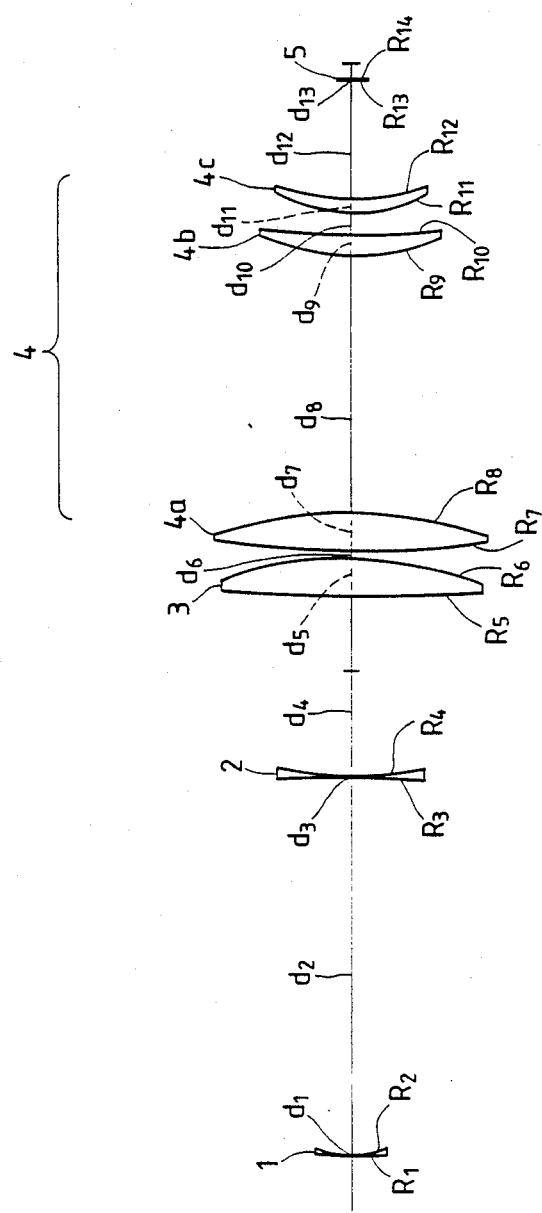
FIG. 8 is a sectional view of an optical projection system according to a third embodiment of this invention.

FIG. 8 shows a third embodiment of this invention which is similar to the embodiment of FIGS. 4–7 except for the following design changes.

In the embodiment of FIG. 8, lens elements 1, 2, 3, 4a, 4b, 4c, and 5 are designed so that their lens parameters have the following values.

| | | |
|---|---|---|
| R1 = 505.350* | d1 = 3.000 | n1 = 1.560769 |
| R2 = 165.000 | d2 = 521.550 | |
| R3 = −2176.430* | d3 = 3.0000 | n2 = 1.560769 |
| R4 = 479.6000 | d4 = 247.377 | |
| R5 = 2477.590* | d5 = 50.0000 | n3 = 1.560769 |
| R6 = −526.1900 | d6 = 11.522 | |
| R7 = 1345.960 | d7 = 50.000 | n4 = 1.560769 |
| R8 = −613.4500 | d8 = 356.208 | |
| R9 = 294.2700 | d9 = 30.000 | n5 = 1.560769 |
| R10 = 1232.070 | d10 = 30.020 | |
| R11 = 193.4100 | d11 = 22.000 | n6 = 1.560769 |
| R12 = 352.1500* | d12 = 161.144 | |
| R13 = −160.7380* | d13 = 3.0000 | n7 = 1.560769 |
| R14 = −301.6440 | | | where the character "*" denotes that the related surface is aspherical, and the radii R1–R14 and the thicknesses and the distances d1–d14 are represented in unit of mm.

The aspherical surfaces (R1, R3, R5, R12, and R13) of the lens elements 1, 2, 3, 4c, and 5 are designed as follows. As described previously, the characteristics of an aspherical surface are defined in the equation (1).

In respect of the aspherical surface (R1) of the lens 1, the coefficients K and A–D are chosen as follows.

| R1: | K = −0.302 | A = 2.593E-8 | B = 3.952E-13 |
|---|---|---|---|
|  |  | C = −2.140E-16 | D = 3.756E-20 | where the character E denotes an exponential, and "E–N" means that the value which precedes "E–N" is multiplied by $10^{-N}$.

In respect of the aspherical surface (R3) of the lens means 2, the coefficients K and A–D are chosen as follows.

| R3: | K = −184.400 | A = −1.541E-8 | B = 7.278E-14 |
|---|---|---|---|
|  |  | C = −2.926E-19 | D = 6.444E-23 |

In respect of the aspherical surface (R5) of the lens means 3, the coefficients K and A–D are chosen as follows.

| R5: | K = 41.240 | A = −1.168E-9 | B = −6.467E-15 |
|---|---|---|---|
|  |  | C = 2.090E-20 | D = −1.210E-25 |

In respect of the aspherical surface (R12) of the lens element 4c, the coefficients K and A–D are chosen as follows.

| R12: | K = 0.0290 | A = −1.084E-9 | B = −3.270E-14 |
|---|---|---|---|
|  |  | C = −3.170E-19 | D = 2.105E-24 |

In respect of the aspherical surface (R13) of the lens means 5, the coefficients K and A–D are chosen as follows.

| R13: | K = −16.008 | A = −5.892E-7 | B = 2.437E-10 |
|---|---|---|---|
|  |  | C = −2.210E-14 | D = −6.476E-17 |

Under conditions where light having a wavelength λ of 193 nm is used and an image height Y is 10.60 mm: the focal length "f" of the optical projection system is 100 mm; the numerical aperture N.A. of the optical projection system is 0.45; the magnification of the optical projection system is 1/5; the focal length f3 of the third lens means 3 is 778.620 mm; and the ratio "f4/d34" between the focal length f4 of the fourth lens means 4 and the distance d34 between the rear principal point of the third lens means 3 and the front principal point of the fourth lens means 4 is 0.867.

FIG. 9(a), FIG. 9(b), and FIG. 9(c) show the spherical aberration, the astigmatism, and the distortion of the optical projection system respectively.

Figure 10A:
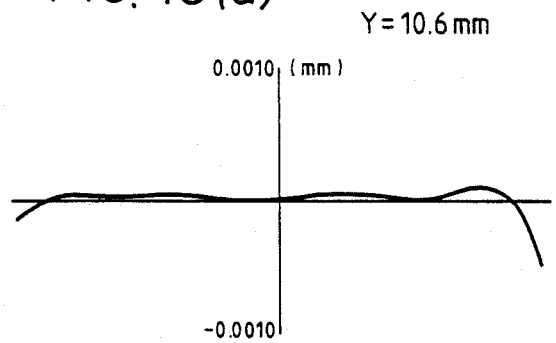
FIG. 10(a) is a diagram showing the meridional transverse aberration in the optical projection system of FIG. 8 which occurs under conditions where an image height is 10.60 mm.
Figure 10B:
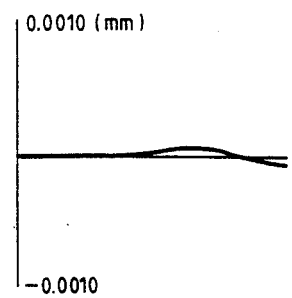
FIG. 10(b) is a diagram showing the sagittal transverse aberration of the optical projection system of FIG. 8 which occurs under conditions where the image height is 10.60 mm.
Figure 10C:
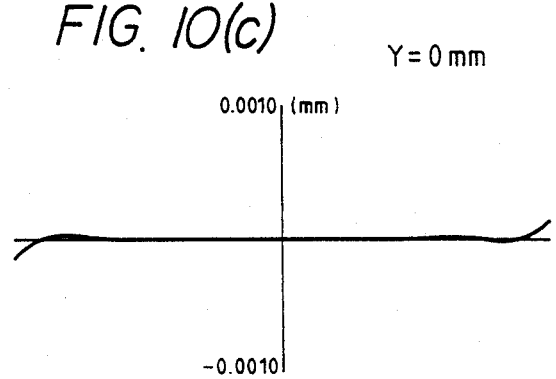
FIG. 10(c) is a diagram showing the meridional transverse aberration in the optical projection system of FIG. 8 which occurs under conditions where the image height is 0 mm.
Figure 10D:
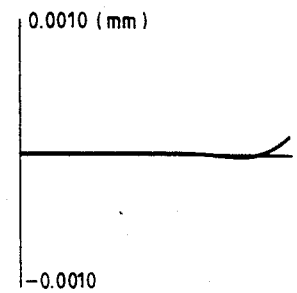
FIG. 10(d) is a diagram showing the sagittal transverse aberration of the optical projection system of FIG. 8 which occurs under conditions where the image height is 0 mm.

FIG. 10(a) and FIG. 10(b) show the meridional transverse aberration and the sagittal transverse aberration of the optical projection system respectively under conditions where the image height Y is 10.60 mm. FIG. 10(c) and FIG. 10(d) show the meridional transverse aberration and the sagittal transverse aberration of the optical projection system respectively under conditions where the image height Y is 0 mm.

DESCRIPTION OF THE FOURTH PREFERRED EMBODIMENT

Figure 11:
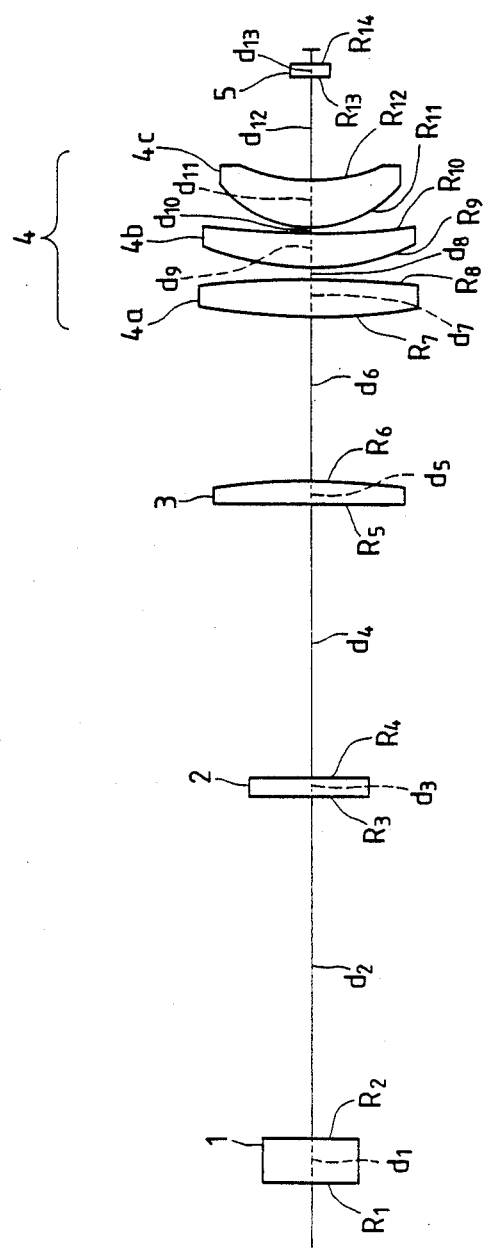
FIG. 11 is a sectional view of an optical projection system according to a fourth embodiment of this invention.

FIG. 11 shows a fourth embodiment of this invention which is similar to the embodiment of FIGS. 4–7 except for the following design changes.

In the embodiment of FIG. 11, lens elements 1, 2, 3, 4a, 4b, 4c, and 5 are designed so that their lens parameters have the following values.

| R1 = 4480.716* | d1 = 57.718 | n1 = 1.560769 |
|---|---|---|
| R2 = 454.077 | d2 = 386.334 |  |
| R3 = −4709.995* | d3 = 22.256 | n2 = 1.560769 |
| R4 = 1649.148 | d4 = 296.127 |  |
| R5 = 2547.206* | d5 = 26.707 | n3 = 1.560769 |
| R6 = −661.2696 | d6 = 180.065 |  |
| R7 = 590.0694 | d7 = 53.909 | n4 = 1.560769 |
| R8 = −1050.142 | d8 = 16.682 |  |
| R9 = 273.9922 | d9 = 39.849 | n5 = 1.560769 |
| R10 = 892.8735 | d10 = 4.125 |  |
| R11 = 128.7190 | d11 = 53.888 | n6 = 1.560769 |
| R12 = 232.1479* | d12 = 113.451 |  |
| R13 = −190.5371* | d13 = 13.384 | n7 = 1.560769 |
| R14 = 429.5090 |  |  | where the character "*" denotes that the related surface is aspherical, and the radii R1–R14 and the thicknesses and the distances d1–d14 are represented in unit of mm.

The aspherical surfaces (R1, R3, R5, R12, and R13) of the lens elements 1, 2, 3, 4c, and 5 are designed as follows. As described previously, the characteristics of an aspherical surface are defined in the equation (1).

In respect of the aspherical surface (R1) of the lens 1, the coefficients K and A–D are chosen as follows.

| R1: | K = −109.360 | A = 1.387E-8 | B = −1.549E-12 |
|---|---|---|---|
|  |  | C = 8.326E-17 | D = −1.882E-20 | where the character E denotes an exponential, and "E–N" means that the value which precedes "E–N" is multiplied by $10^{-N}$.

In respect of the aspherical surface (R3) of the lens means 2, the coefficients K and A–D are chosen as follows.

| R3: | K = −3933.68 | A = −2.565E-8 | B = 3.056E-13 |
|---|---|---|---|
|  |  | C = −7.972E-18 | D = 3.337E-22 |

In respect of the aspherical surface (R5) of the lens means 3, the coefficients K and A–D are chosen as follows.

| R5: | K = 3.993 | A = −1.415E-9 | B = −5.250E-14 |
|---|---|---|---|
|  |  | C = −5.048E-19 | D = −1.293E-23 |

In respect of the aspherical surface (R12) of the lens elements 4c, the coefficients K and A–D are chosen as follows.

| R12: | K = −0.00887 | A = −1.399E-9 | B = −3.901E-13 |
|---|---|---|---|
|  |  | C = −2.368E-19 | D = 1.441E-22 |

In respect of the aspherical surface (R13) of the lens means 5, the coefficients K and A–D are chosen as follows.

| R13: | K = 5.798 | A = −8.440E-7 | B = 5.184E-10 |
|---|---|---|---|
|  |  | C = −2.209E-14 | D = −6.476E-17 |

Under conditions where light having a wavelength λ of 193 nm is used and an image height Y is 10.60 mm: the focal length "f" of the optical projection system is 100 mm; the numerical aperture N.A. of the optical projection system is 0.45; the magnification of the optical projection system is 1/5; the focal length f3 of the third lens means 3 is 905.876 mm; and the ratio "f4/d34" between the focal length f4 of the fourth lens means 4 and the distance d34 between the rear principal point of the third lens means 3 and the front principal point of the fourth lens means 4 is 0.907.

FIG. 12(a), FIG. 12(b), and FIG. 12(c) show the spherical aberration, the astigmatism, and the distortion of the optical projection system respectively.

FIG. 13(a) and FIG. 13(b) show the meridional transverse aberration and the sagittal transverse aberration of the optical projection system respectively under conditions where the image height Y is 10.60 mm. FIG. 13(c) and FIG. 13(d) show the meridional transverse aberration and the sagittal transverse aberration of the optical projection system respectively under conditions where the image height Y is 0 mm.

DESCRIPTION OF THE FIFTH PREFERRED EMBODIMENT

Figure 14:
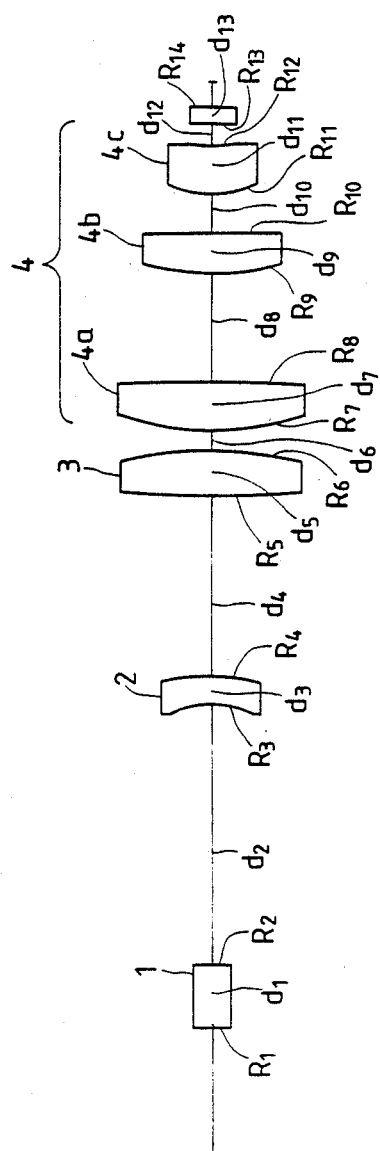
FIG. 14 is a sectional view of an optical projection system according to a fifth embodiment of this invention.

FIG. 14 shows a fifth embodiment of this invention which is similar to the embodiment of FIGS. 4–7 except for the following design changes.

In the embodiment of FIG. 14, lens elements 1, 2, 3, 4a, 4b, 4c, and 5 are designed so that their lens parameters have the following values.

| R1 = −647.0977 | d1 = 200.00 | n1 = 1.560769 |
|---|---|---|
| R2 = 545.1320 | d2 = 821.1736 |  |
| R3 = −333.2931* | d3 = 86.586 | n2 = 1.560769 |
| R4 = −715.0375 | d4 = 549.439 |  |
| R5 = 2243.695* | d5 = 143.590 | n3 = 1.560769 |
| R6 = −1201.589 | d6 = 66.666 |  |
| R7 = 855.2784 | d7 = 149.058 | n4 = 1.560769 |
| R8 = −7031.113 | d8 = 330.014 |  |
| R9 = 758.2768 | d9 = 120.777 | n5 = 1.560769 |
| R10 = −5024.299 | d10 = 126.382 |  |
| R11 = 352.3274 | d11 = 152.195 | n6 = 1.560769 |
| R12 = 547.6737* | d12 = 58.639 |  |
| R13 = 389366.05* | d13 = 50.004 | n7 = 1.560769 |
| R14 = 80504.838 |  |  | where the character "*" denotes that the related surface is aspherical, and the radii R1–R14 and the thicknesses and the distances d1–d14 are represented in unit of mm.

where the character "*" denotes that the related surface is aspherical, and the radii R1–R14 and the thicknesses and the distances d1–d14 are represented in unit of mm.

The aspherical surfaces (R3, R5, R12, and R13) of the lens elements 2, 3, 4c, and 5 are designed as follows. As described previously, the characteristics of an aspherical surface are defined in the equation (1).

In respect of the aspherical surface (R3) of the lens means 2, the coefficients K and A–D are chosen as follows.

| R3: | K = −0.05174 | A = 2.681E-10 | B = −8.178E-16 |
|---|---|---|---|
|  |  | C = 5.872E-20 | D = 2.065E-24 | where the character E denotes an exponential, and "E-N" means that the value which precedes "E-N" is multiplied by $10^{-N}$.

In respect of the aspherical surface (R5) of the lens means 3, the coefficients K and A–D are chosen as follows.

| R5: | K = 5.8542 | A = −8.318E-10 | B = 2.365E-16 |
|---|---|---|---|
|  |  | C = −2.343E-21 | D = −2.984E-27 |

In respect of the aspherical surface (R12) of the lens element 4c, the coefficients K and A–D are chosen as follows.

| R12: | K = 1.6202 | A = 1.038E-9 | B = −1.150E-14 |
|---|---|---|---|
|  |  | C = 3.064E-18 | D = 9.213E-23 |

In respect of the aspherical surface (R13) of the lens means 5, the coefficients K and A–D are chosen as follows.

| R13: | K = 0.0000 | A = −1.434E-10 | B = −1.001E-10 |
|---|---|---|---|
|  |  | C = 2.288E-17 | D = −2.529E-30 |

Under conditions where light having a wavelength λ of 193 nm is used and an image height Y is 10.60 mm: the focal length "f" of the optical projection system is 100 mm; the numerical aperture N.A. of the optical projection system is 0.45; the magnification of the optical projection system is 1/5; the focal length f3 of the third lens means 3 is 1416.653 mm; and the ratio "f4/d34" between the focal length f4 of the fourth lens means 4 and the distance d34 between the rear principal point of the third lens means 3 and the front principal point of the fourth lens means 4 is 1.125.

Figures 15A, 15B, 15C:
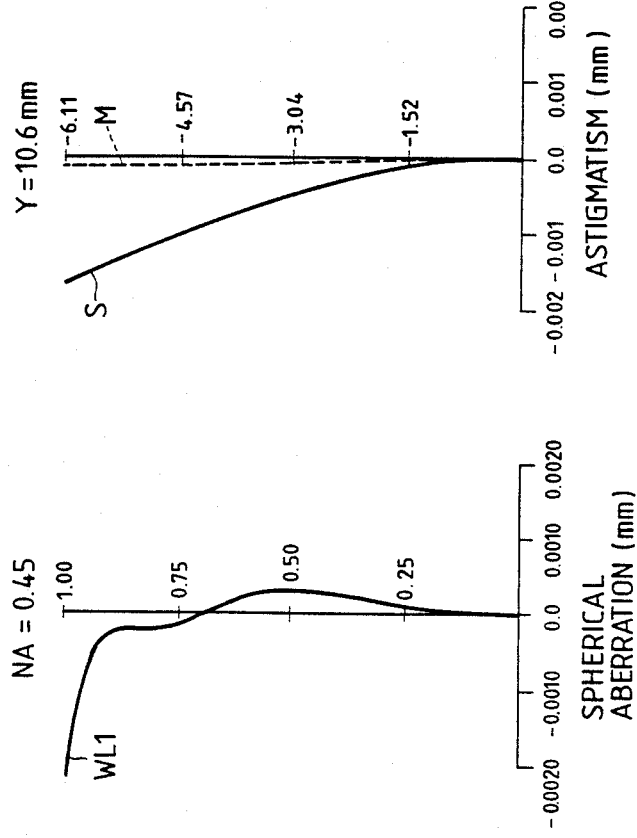
FIG. 15(a) is a diagram showing the spherical aberration in the optical projection system of FIG. 14.
FIG. 15(b) is a diagram showing the astigmatism in the optical projection system of FIG. 14.
FIG. 15(c) is a diagram showing the distortion in the optical projection system of FIG. 14.

FIG. 15(a), FIG. 15(b), and FIG. 15(c) show the spherical aberration, the astigmatism, and the distortion of the optical projection system respectively.

Figure 16A:
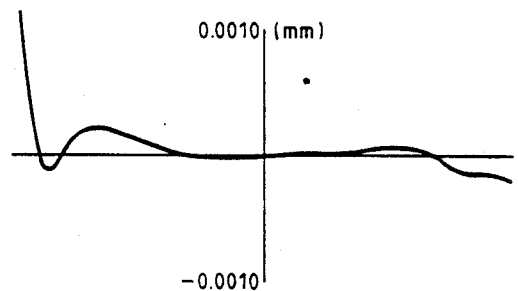
FIG. 16(a) is a diagram showing the meridional transverse aberration in the optical projection system of FIG. 14 which occurs under conditions where an image height is 10.60 mm.
Figure 16B:
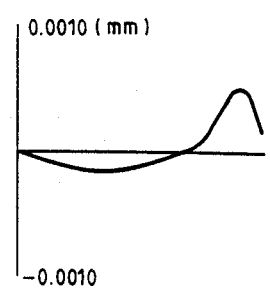
FIG. 16(b) is a diagram showing the sagittal transverse aberration of the optical projection system of FIG. 14 which occurs under conditions where the image height is 10.60 mm.
Figure 16C:
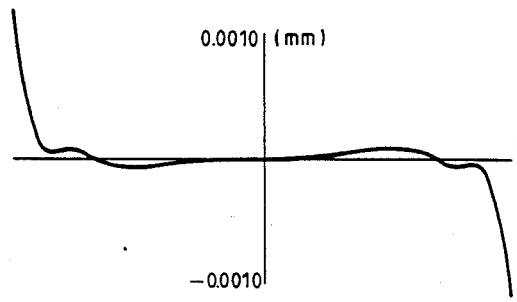
FIG. 16(c) is a diagram showing the meridional transverse aberration in the optical projection system of FIG. 14 which occurs under conditions where the image height is 0 mm.
Figure 16D:
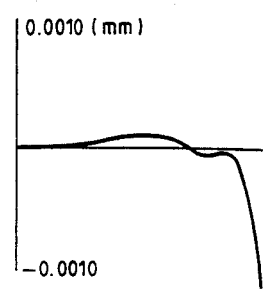
FIG. 16(d) is a diagram showing the sagittal transverse aberration of the optical projection system of FIG. 14 which occurs under conditions where the image height is 0 mm.

FIG. 16(a) and FIG. 16(b) show the meridional transverse aberration and the sagittal transverse aberration of the optical projection system respectively under conditions where the image height Y is 10.60 mm. FIG. 16(c) and FIG. 16(d) show the meridional transverse aberration and the sagittal transverse aberration of the optical projection system respectively under conditions where the image height Y is 0 mm.

What is claimed is:

1. An optical projection system comprising:
   a first lens means, a second lens means, and a third lens means, each consisting of a single lens element, arranged successively in a direction of travel of a ray, the first lens means having a predetermined negative refracting power, the second lens means having a predetermined negative refracting power, the third lens means having a predetermined positive refracting power;
   a fourth lens means consisting of a plurality of lens elements which follows the third lens means in the direction of travel of the ray and which has a predetermined positive refracting power;
   wherein at least one surface of the first, second, third, and fourth lens elements is aspherical, and wherein the following conditions (1), (2) and (3) are satisfied:

$$4f < f3 < 20f \quad (1)$$

$$0.65 < (f4/d34) < 1.40 \quad (2)$$

$$10f < R5 \quad (3)$$

where the character "f" denotes a focal length of the optical projection system, the character "f3" denotes a focal length of the third lens means, the character "f4" denotes a focal length of the fourth lens means, the character "d34" denotes a distance between a rear principal point of the third lens means and a front principal point of the fourth lens means, and the character "R5" denotes a radius of curvature of a front surface of the third lens means.

2. The optical projection system of claim 1 wherein the front surface of the third lens means is aspherical.

3. The optical projection system of claim 1 wherein the fourth lens elements have predetermined positive refracting powers.

4. An optical projection system comprising:
a first lens means, a second lens means, and a third lens means, each consisting of a single lens element, arranged successively in a direction of travel of a ray, the first lens means having a predetermined negative refracting power, the second lens means having a predetermined negative refracting power, the third lens means having a predetermined positive refracting power;
a fourth lens means consisting of a plurality of lens elements which follows the third lens means in the direction of travel of the ray and which has a predetermined positive refracting power;
a fifth lens means consisting of a single lens element following the fourth lens means in the direction of travel of the ray and having a predetermined negative refracting power;
wherein at least one surface of the first, second, third, fourth and fifth lens elements is aspherical, and wherein the following conditions (1), (2), and (3) are satisfied:

$$4f < f3 < 20f \quad (1)$$

$$0.65 < (f4/d34) < 1.40 \quad (2)$$

$$10f < R5 \quad (3)$$

where the character "f" denotes a focal length of the optical projection system, the character "f3" denotes a focal length of the third lens means, the character "f4" denotes a focal length of the fourth lens means, the character "d34" denotes a distance between a rear principal point of the third lens means and a front principal point of the fourth lens means, and the character "R5" denotes a radius of curvature of a front surface of the third lens means.

5. The optical projection system of claim 4 wherein the front surface of the third lens means is aspherical.

6. The optical projection system of claim 4 wherein the fourth lens elements have predetermined positive refracting powers.

* * * * *